United States Patent [19]

Lukes

[11] Patent Number: 4,998,572

[45] Date of Patent: Mar. 12, 1991

[54] CHISEL STABILIZER FOR WOOD TURNING TOOL

[76] Inventor: Richard Lukes, 440 Beach St., Los Angeles, Calif. 90065

[21] Appl. No.: 389,494

[22] Filed: Aug. 4, 1989

[51] Int. Cl.$^5$ .......................... B27C 7/06; B23B 29/12; B23B 29/22

[52] U.S. Cl. .......................................... 142/55; 142/49; 142/56; 16/111 R; 16/DIG. 12; 30/340

[58] Field of Search ...................... 16/111 R, DIG. 12; 30/340; 82/158; 142/35, 46, 31, 21, 22, 36, 40, 37, 41, 42, 38, 39, 43, 44, 49, 56

[56] References Cited

U.S. PATENT DOCUMENTS

| | | | |
|---|---|---|---|
| 325,085 | 8/1885 | Hubbard | 142/56 |
| 675,184 | 5/1901 | Armstrong | 142/56 |
| 2,262,540 | 11/1941 | Stone | 30/340 |
| 2,848,020 | 8/1958 | Zembrowski | 142/56 |
| 3,172,439 | 3/1965 | Fischer | 16/DIG. 12 |
| 3,304,969 | 2/1967 | MacDougall | 142/49 |
| 3,979,040 | 9/1976 | Denin | 227/113 |
| 4,126,165 | 11/1978 | Guignard | 142/56 |
| 4,745,656 | 5/1988 | Revlett | 16/110 R |

*Primary Examiner*—William E. Terrell
*Attorney, Agent, or Firm*—Pretty, Schroeder, Brueggemann & Clark

[57] ABSTRACT

A stabilizer is provided for attachment to the generally flat bar of a wood turning tool. The stabilizer comprises a generally cylindrical sleeve having a central axially extending slot sized to receive the flat bar of the tool. The tool and stabilizer combination is rotatably supported on a tool rest associated with a lathe, such that the combination contacts the tool rest at a point that is vertically aligned with any point along the cutting blade of the cutting tool, substantially eliminating any rotational torque that could otherwise be generated as the cutting tool is moved into cutting engagement with the turning wood.

21 Claims, 2 Drawing Sheets

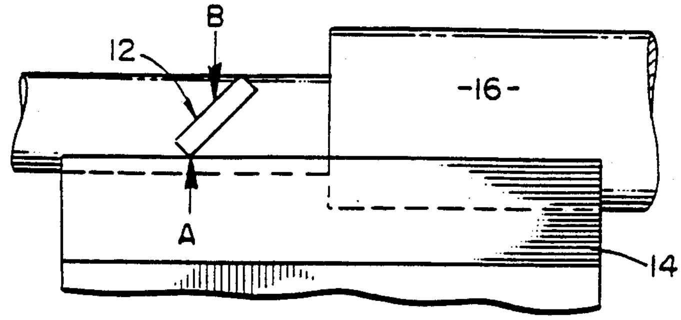
FIG. 1
PRIOR ART
FIG. 2
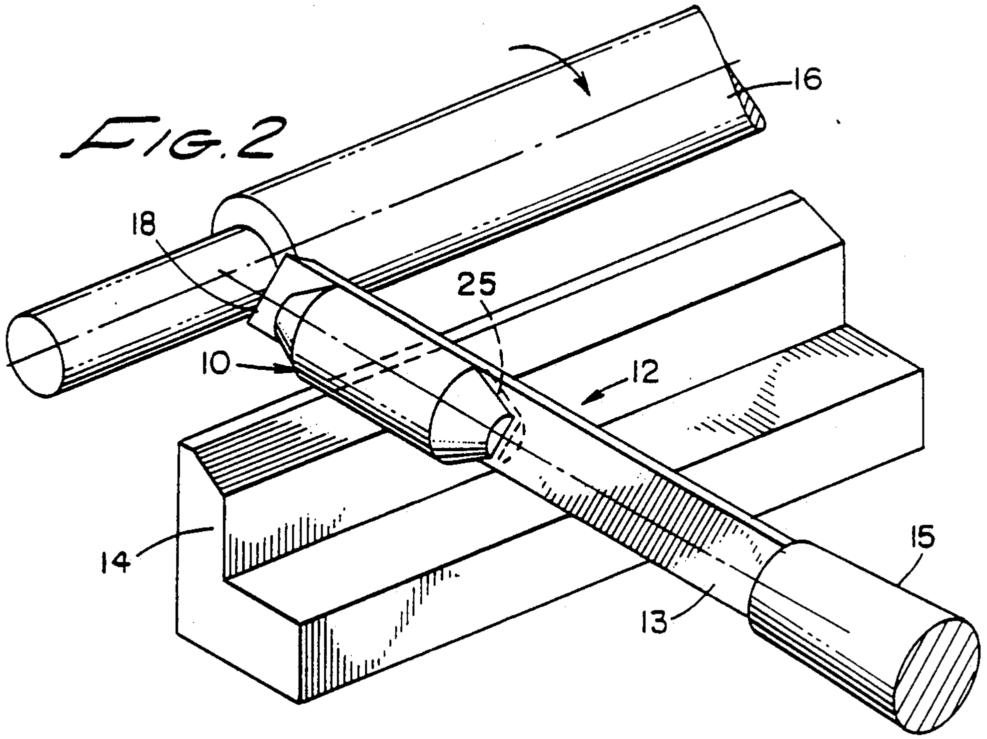
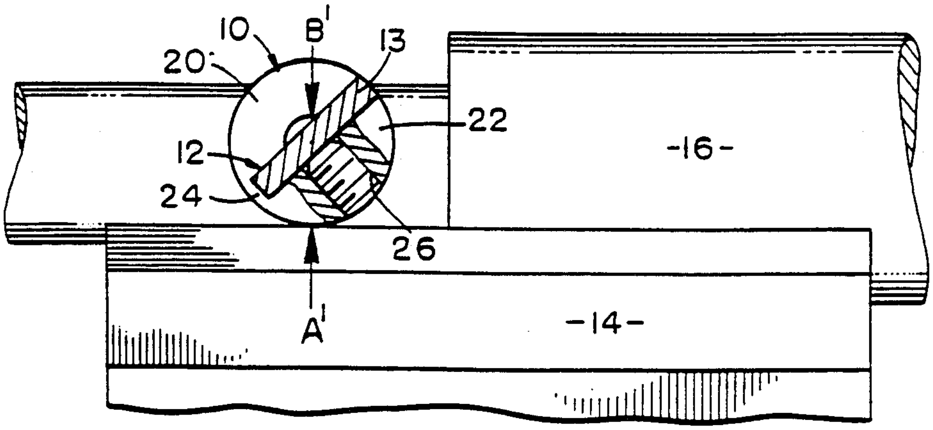
FIG. 3

CHISEL STABILIZER FOR WOOD TURNING TOOL

BACKGROUND OF THE INVENTION

1. Field of the Invention

This invention relates to tools used in wood turning, and more particularly to stabilizers for wood turning cutting tools.

2. Description of the Related Art

Wood chisels used in wood turning on a lathe typically comprise a flat, elongated bar with a handle at one end and a cutting blade at the other. The cutting blade of the wood turning tool has a shape that is tailored to its particular purpose. For example, a diagonal blade is used for removing relatively large portions of wood material in a slicing manner and is referred to as a skew. A rounded blade is used for finer cutting in a scraping motion and is called a scraper. Regardless of the shape of the cutting blade, the blade is typically beveled. The cutting blade is brought into engagement with the rotating wood, and thereby removes wood material and provides the desired form and surface finish.

In use, one edge of the elongated bar portion of the wood turning tool is rested on the tool rest of a lathe as the beveled cutting blade of the tool is moved into cutting engagement with the rotating wood. The approach angle of the tool to the wood may range from straight on, perpendicular to the longitudinal axis, to more angular approaches closer alongside of the wood. Typically, the tool is rotated as it is employed on the wood in order to achieve the desired form and finish. During the rotation, the top or corner of the blade may be used as well as the center or middle portion of the blade, and all points in between. That is, the tool may contact the turning wood at any point along the cutting blade. Because of the rotation, the cutting point of the tool is rarely in the same vertical plane as the point at which the flat bar of the tool contacts the tool rest. Because of this vertical misalignment, a twisting torque is generated from the contact of the wood turning tool with the rotating wood, and this torque must be resisted by the person holding the tool. This can be dangerous, because the tool blade can twist or rotate in the user's hand and fly out of the user's grip, or the tool blade can rotate and dig into the rotating wood, causing the wood to fragment and fly through the air. It is desirable to provide greater safety for the user in turning wood, and provide greater control over the cutting operation.

SUMMARY OF THE INVENTION

The present invention provides a generally cylindrical tool support, or stabilizer, for attachment to a wood turning tool, such as a chisel, used to cut wood turning on a lathe. The stabilizer encircles at least one edge of the flat bar of the wood turning tool, spaced a short portion rearwardly from the tool's beveled cutting edge, and the stabilizer, not the tool itself, is made to rest on a tool rest associated with the lathe. The point at which the stabilizer contacts the tool rest is substantially vertically beneath whatever tool bar portion is in cutting engagement with the wood, and thus is in substantially the same vertical plane as the portion of the cutting edge that engages the rotating wood. Because of this vertical alignment, substantially no torque is generated that might otherwise cause the tool to twist out of the user's grip or to dig excessively into the rotating wood. Thus, the stabilizer of the present invention stabilizes the wood turning tool while it is moved and rotated along the lathe tool rest into cutting engagement with the rotating wood. The present invention thereby allows much greater control of the tool during the wood turning process and provides increased safety.

In one embodiment of the present invention, the stabilizer comprises a cylindrical block of cold rolled steel having a longitudinal slot for receiving the flat, elongated bar portion of the wood turning tool. The stabilizer also includes a lateral bore to receive a set screw that can be tightened against the bar and thereby secure the stabilizer to the tool.

In another embodiment, the stabilizer comprises a hollow cylinder constructed from spring steel. The hollow cylinder includes a longitudinal slot into which the elongated bar portion of a wood turning tool may be inserted. The force of the spring steel of the cylinder clamps the stabilizer against the flat bar and thus holds the stabilizer in a selected position by a spring fit.

Another embodiment of the present invention comprises a hollow cylinder that completely encloses the flat bar portion of a wood turning tool. If the inner diameter of the hollow cylinder is greater than the width of the flat portion of the tool, one or more wedges may be inserted between the tool and the inner surface of the hollow cylinder so as to wedge the tool and to fix the tool in position relative to the hollow cylinder. For maximum control over the tool, the tool must be in a fixed position relative to the stabilizer. Otherwise, the tool can twist out of the control of the user, suffering the same lack of control as with the prior art.

In yet another embodiment of the present invention, the stabilizer is comprised of semicircular cylindrical support portions, each having a flat face that is placed against the opposite sides of the bar portion of the wood turning tool. These support portions may be constructed from a magnetic material, which allows the stabilizer portions to remain in fixed relation to the wood turning tool without external attachment means.

In all of the embodiments described, the longitudinal ends of the stabilizer may be provided with a conical shape. This shape allows the stabilizer to be moved closer to the rotating wood than would a stabilizer with a blunt end. The degree of taper may be adjusted as desired. For example, the opposite conical ends may be provided with a 30° and 45° taper, respectively, for use with rotating wood pieces of varying radii.

In each embodiment described above, the objects of the present invention are obtained; namely, substantial vertical alignment of the cutting portion of a wood turning tool with the point of contact on the lathe tool rest. Other features and advantages of the present invention will be appreciated from the following description of the preferred embodiments, taken in conjunction with the accompanying drawings, which illustrate, by way of example, the principles of the invention.

BRIEF DESCRIPTION OF THE DRAWINGS

FIG. 1 is a front elevational view of a chisel being used in a wood turning operation without the benefit of the present invention.

FIG. 2 is a perspective view of a preferred embodiment of a stabilizer in accordance with the present invention, being used with a wood chisel in a wood turning operation.

FIG. 3 is a front elevational view of the stabilizer of FIG. 2, being used in a wood turning operation.

DESCRIPTION OF THE PREFERRED EMBODIMENTS

Figure 4:
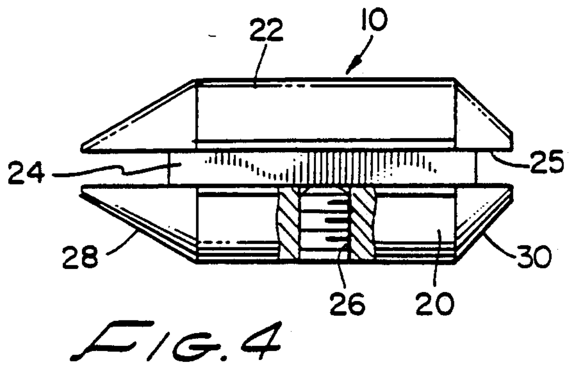
FIG. 4 is a top view of the stabilizer of FIG. 2, looking down on the elongated slot that receives the bar portion of the chisel.

The following descriptions of the present invention are not to be taken in a limiting sense, but are made merely for the purpose of illustrating the general principles of the invention. The scope of the invention is best defined by the appended claims. Like reference numerals refer to like elements in the several drawings. The following detailed descriptions are of the best presently contemplated modes of carrying out the invention.

FIG. 1 shows a front elevational view of a wood turning tool 12 being used with a lathe (not shown) to shape a turning piece of wood 16, without the benefit of the present invention. The bottom edge of the tool 12 contacts a fixed tool rest 14 at a point marked A in the drawing. The tool generally provides optimal cutting of the wood 16 if the tool is handled at a slight angle from the vertical, as illustrated in the drawing. In FIG. 1, the tool has been moved into engagement with the wood so as to put the center of the tool's cutting blade in cutting engagement with the wood. Thus, in elevational view, the point of contact between the tool's cutting blade and the wood is indicated in FIG. 1 by the arrow marked B. As can be seen, the point of contact A between the tool and the tool rest and the point of contact B between the tool and the wood are not vertically aligned.

FIG. 2 and FIG. 3 show the wood turning tool support 10, or stabilizer, of the present invention being used with a wood turning tool 12. FIG. 3 is a front elevational view corresponding to the perspective view of FIG. 2. The wood turning tool includes a flat, elongated bar portion 13 and a handle 15. The stabilizer 10 is attached to the flat bar portion of the tool. The combination of the tool and stabilizer are resting on a tool rest 14 of a wood turning lathe (not illustrated). Without the stabilizer 10, the flat bar portion 13 of the tool would be resting on the tool rest. In FIG. 2, the tool 12 is shown being used on an elongated piece of wood 16 that is rotating in the direction indicated by the arrow. A beveled cutting blade 18 of the tool is urged by the operator into cutting engagement with the rotating wood. It is the stabilizer, and not the tool itself, that rests on the tool rest. The portion of the stabilizer that actually contacts the tool rest is indicated in FIG. 3 by the arrow labeled A'. The point of contact of the cutting blade 18 of the tool 12 with the wood is marked with the arrow labeled B'. As the tool is employed on the wood, the tool is rotated in order to achieve the desired form and finish. FIG. 3 illustrates that regardless of rotation of the tool, the stabilizer and not the tool will be in contact with the tool rest.

Thus, the portion of the stabilizer 10 in contact with the tool rest 14 is in substantially the same vertical plane as the portion of the tool's cutting blade 18 that engages the turning wood 16. This is illustrated in FIG. 3 by noting that the arrow A' marking the point of contact between the stabilizer and the tool rest, and the arrow labeled B' marking the point of contact between the tool and the wood, are substantially in vertical alignment. This alignment ensures that substantially no twisting torque is produced that might otherwise fling the tool out of the operator's hands or dig the tool excessively into the turning wood. This stabilizes the tool during the wood turning operation.

It is the cylindrical shape of the stabilizer's outer surface that ensures that the lowermost portion of the stabilizer that contacts the tool rest 14 will be aligned with the cutting point of the tool 12. The curved surface of the stabilizer also makes it convenient to rotate the tool as it is moved into cutting engagement with the wood 16. This allows a desirable amount of variation in the cutting action of the chisel as the wood rotates, producing the particular cutting action for the form or finish desired. Thus, the stabilizer is suitable for use with a variety of wood turning tools, such as skews and scrapers.

FIG. 4 is a top view of the stabilizer 10 of FIGS. 2 and 3, depicting two semicircular half-cylinders 20 and 22 spaced apart by a bridge portion 24. A longitudinally-extending slot 25 is defined between the half-cylinders, and is sized to receive the flat portion 13 of the wood turning tool 12. A threaded bore 26 may be provided through the side of the stabilizer to receive a set screw that may be tightened against the flat portion of the received tool, thereby holding the stabilizer in place relative to the tool. A portion of the tool's remote end approximately ¾ inch in length projects from the end of the stabilizer to expose the cutting edge, or blade, of the tool.

Rather than having ends that are blunt and flat, the stabilizer 10 may be provided with conically tapered ends 28 and 30 having different degrees of taper. In the illustration, one end 28 is provided with 30° of taper, while the other end 30 is provided with 45° of taper. When turning wood 16, it is desirable to move the wood turning tool and the tool rest as close to the piece of rotating wood as possible. Depending on the wood turning tool used and the desired cutting action, it may be preferable to move the wood turning tool into cutting engagement with the rotating wood at a point along the longitudinal axis of the rotating wood or at a point slightly above or below the axis. The variable taper on the ends 28 and 30 of the stabilizer allows the tool/stabilizer combination to be moved as close as possible to the rotating wood regardless of the radius of the wood.

The end 30 of the stabilizer 10 with the shorter taper would be preferable for use with wood having a small turning radius. The short taper allows the tool rest and the tool/stabilizer combination to be moved closer to the turning wood than otherwise possible. The end 28 of the stabilizer with the longer taper would be suitable for use with wood having a relatively large diameter, allowing the tool/stabilizer combination to be moved close to the turning wood without the stabilizer contacting the wood.

In the preferred embodiment, the stabilizer 10 is made from a solid piece of cold rolled steel. This provides the desired strength and durability. The cold rolled steel also provides a desirable, attractive smooth surface finish with a minimal amount of machining. Other alternate materials may be used, such as other metals or plastic. Metal is preferred, however, because it has superior durability and its greater relative weight reduces undesirable vibrations.

Figure 5:
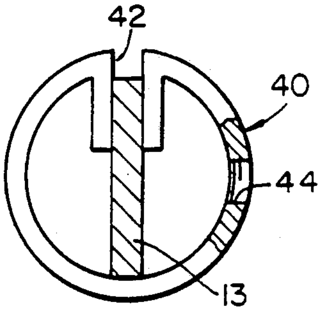
FIGS. 5, 6, 7, 8, and 9 are perspective views of alternate preferred embodiments of the present invention.

FIG. 5 illustrates a second preferred embodiment of a wood turning tool stabilizer in accordance with the present invention. The stabilizer comprises a hollow cylinder 40 having an axially-extending slot 42 that receives the flat bar portion 13 of a wood turning tool. As with the previous embodiment, the stabilizer encircles the flat portion of the wood turning tool and provides vertical alignment between the tool point of contact on the wood and the stabilizer point of contact on the tool rest. Again, a threaded bore 44 may be provided in the side of the stabilizer to receive a set screw that may be tightened against the flat bar portion of the wood turning tool, to hold the stabilizer in place. Alternatively, the cylinder 40 may be constructed of spring steel such that the cylinder may be urged open so as to enlarge the slot 42 for receiving the tool and then released, allowing the cylinder 40 to spring back and hold itself about the tool by a friction, spring fit. This eliminates the need for a bore and a set screw to hold the stabilizer on the tool.

Figure 6:
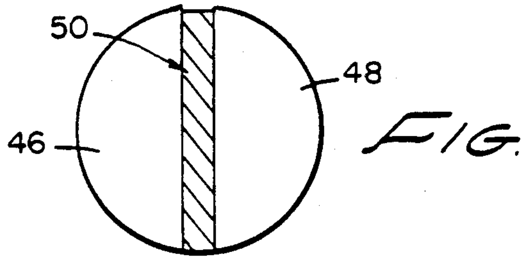

FIG. 6 shows a third preferred embodiment of the present invention in which the stabilizer comprises two semicylindrical halves 46 and 48. The halves are preferably constructed from a magnetic material, such that they will remain magnetically attached to the metallic bar portion 13 of a wood turning tool. Alternatively, it is necessary to use only one of the halves in order to obtain the advantages of the present invention. That is, the lowermost portion of the stabilizer-tool combination having contact with the tool rest 14 will be either the stabilizer half 46 or the stabilizer half 48. In either case, using both halves 46 and 48 or only one, the stabilizer halves ensure the vertical alignment between the tool cutting point and the tool rest contact point, as described above in connection with FIGS. 2 and 3. The magnetic attraction of the stabilizer material to the tool obviates the need for a friction attachment means such as a threaded bore and set screw.

Figure 7:
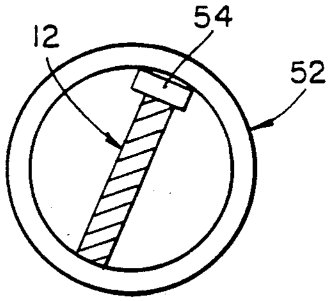

FIG. 7 shows yet another embodiment of the present invention, in which the stabilizer comprises a hollow cylinder 52 that slides over and completely encloses the flat bar portion 13 of a wood turning tool. This stabilizer embodiment also ensures the vertical alignment between the tool cutting point and the stabilizer point of contact with the lathe tool rest 14, as described above in connection with FIGS. 2 and 3. If the inside diameter of the stabilizer is substantially greater than the width of the tool 13, a wedge 54 may be inserted in the space between the tool edge and the inside wall of the stabilizer. Using the wedge fixes the tool in position relative to the stabilizer, thus enabling easier rotation of the stabilizer/tool combination on the tool rest of a lathe. Fixing the position of the wood turning tool relative to the stabilizer provides the desired vertical alignment as the tool is rotated from the vertical. Allowing the tool to move relative to the stabilizer could allow the tool to twist out of the user's grip or dig excessively into the wood, thus obviating the desired benefits of the present invention.

Figure 8:
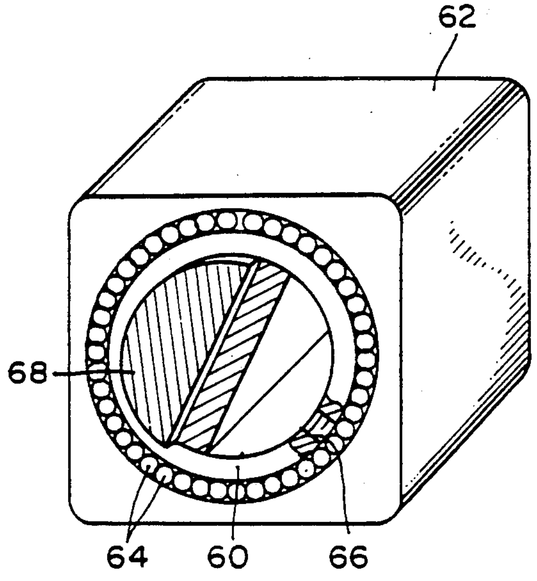

FIG. 8 shows another embodiment of the present invention, in which the stabilizer comprises a hollow cylinder 60 rotatably supported within the hollow bore of a housing 62 by a plurality of ball bearings 64. Alternatively, roller bearings may be used instead of ball bearings. The flat bar portion 13 of a wood turning tool may be inserted lengthwise into the hollow cylinder 60 and moved into engagement with a rotating piece of wood. As with the other embodiments, this stabilizer embodiment elevates the tool from the tool rest of a lathe and also ensures a vertical alignment between the tool cutting point and the point of contact with the tool rest. A threaded bore 66 may be provided in the wall of the hollow cylinder 60 to fix the wood turning tool relative to the cylinder. Alternatively, one or more wedges 68 may be placed between the tool and the inside surface of the cylinder. The wedges may be semicircular as shown in FIG. 8 and may be placed on one or both sides of the tool flat bar portion 13, or the wedges may be somewhat rectangular, as shown in FIG. 7. Any of these constructions described above will provide the desired vertical alignment.

Figure 9:
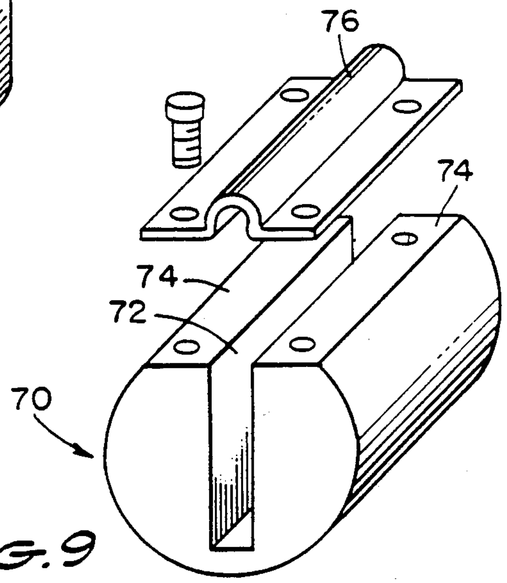

FIG. 9 shows yet another embodiment of the present invention, in which the stabilizer comprises a semicylindrical member 70 having a longitudinally extending slot 72 sized to receive the flat bar portion of a wood turning tool. Two flat faces 74 of the stabilizer are provided adjacent the longitudinally extending slot. A stabilizer cap 76 is attached to the stabilizer against the flat faces, thereby holding the flat bar portion of the wood turning tool securely in the longitudinally extending slot 72. The stabilizer cap may be attached to the cylinder 70 by means of screws extending through the stabilizer cap and into the body of the cylinder. Other means of attaching the cap to the cylinder may be used, such as constructing either the cylinder or the cap from a magnetic material and relying upon the forces of magnetic attraction to hold the cap against the cylinder.

The present invention has been described above in terms of several presently preferred embodiments, so that an understanding of the present invention may be conveyed. There are, however, many configurations for stabilizers that cannot be specifically considered herein but with which the present invention is applicable. The present invention therefore should not be seen as being limited to the particular embodiments described, but rather it should be understood that the present invention has wide applicability with respect to various materials and configurations. These other materials and configurations will be known to those skilled in the art in view of the descriptions above.

What I claim is:

1. A wood turning tool support, for use with a lathe having a fixed tool rest and with a wood turning tool having a flat bar including a cutting blade at one end and having a handle attached to the bar, comprising a generally cylindrical stabilizer body having an exterior surface for rotatably contacting the tool rest and an interior portion for fixedly attaching to the flat bar of the tool, the stabilizer body encircling at least one side edge of the flat bar of the tool such that the lengthwise axis of the stabilizer body is parallel to the lengthwise axis of the bar, and the body is spaced back from the cutting blade of the tool, the interior portion and the exterior surface being relatively located and configured to facilitate the tool and stabilizer body to be rotated on the fixed tool rest of the lathe about the same longitudinal axis to substantially vertically align the point of contact of the cutting blade on the wood and the point of contact of the stabilizer body on the tool rest.

2. A wood turning tool support as claimed in claim 1, wherein said stabilizer body includes a longitudinal slot for receiving the flat bar of the wood turning tool.

3. A stabilizer as claimed in claim 2, further including a stabilizer cap, attached to the stabilizer, that extends over the longitudinal slot and holds the tool therein.

4. A wood turning tool support as claimed in claim 2, further including a lateral bore in the stabilizer body that can receive a set screw that is tightened against the flat bar of the wood turning tool.

5. A wood turning tool support as claimed in claim 1, wherein opposite ends of the stabilizer body are conically tapered.

6. A stabilizer as claimed in claim 5, wherein one end has a conical taper of about 30° and the other end has a conical taper of about 45°.

7. A stabilizer as claimed in claim 1, comprising a hollow cylinder sized to completely encircle the flat bar of the wood turning tool.

8. A stabilizer as claimed in claim 7, and further comprising at least one wedge sized to fit between the inner surface of the hollow cylinder and the flat bar of the wood turning tool.

9. A stabilizer as claimed in claim 1, comprising a hollow cylinder including a longitudinal slot for receiving the flat bar of the wood turning tool.

10. A stabilizer as claimed in claim 9, further including a lateral bore that may receive a set screw that is tightened against the flat bar of the wood turning tool.

11. A stabilizer as claimed in claim 9, wherein the stabilizer is constructed from spring steel.

12. A wood turning tool stabilizer, for use with a lathe having a fixed tool rest and with a wood turning tool having a flat bar with a cutting blade for cutting wood turning on the lathe and a handle for holding the tool, comprising first and second semicylindrical portions, each having a flat surface and a curved surface, the flat surfaces of the two semicylindrical portions being for fixedly attaching to first and second opposed flat surface of the wood turning tool flat bar, extending along a length of the flat bar, the curved surface of the semicylindrical portions being for rotatably contacting the tool rest, thereby presenting a continuous curved surface from the curved surface of one semicylindrical portion to the curved surface of the other semicylindrical portion, the flat surfaces and the curved surfaces being relatively located and configured to facilitate the tool and stabilizer to be rotated on the tool rest over the continuous curved surface and to substantially vertically align the cutting blade's point of contact with the wood and the stabilizer's point of contact with the tool rest.

13. A stabilizer as claimed in claim 12, wherein the semicylindrical portions are comprised of a magnetic material.

14. A stabilizer as claimed in claim 12, wherein the two semicylindrical portions may be separately and independently attached to the wood turning tool.

15. A wood turning tool stabilizer as claimed in claim 12, wherein the stabilizer further includes a bridge portion that holds the two semicylindrical portions in spaced-apart relation and forms part of the curved surface from one semicylindrical portion to the other.

16. A stabilizer as claimed in claim 15, wherein the stabilizer is formed from cold rolled steel.

17. A stabilizer as claimed in claim 15, wherein the semicylindrical portions are conically tapered at each end.

18. A stabilizer as claimed in claim 17, wherein one end has a taper of about 30° and the other end has a taper of about 45°.

19. A wood turning tool stabilizer for use with a lathe having a fixed tool rest and with a wood turning tool having a flat bar including a cutting blade at one end and having a handle attached to the bar, comprising:

a hollow cylinder having an diameter large enough to accept the width of the flat bar of a wood turning tool;

a stabilizer housing having a hollow bore that receives the hollow cylinder and a flat exterior surface for engaging the tool rest and support means for supporting the hollow cylinder with the housing such that the hollow cylinder may freely rotate within the housing means for securing the flat bar of the tool within the hollow cylinder with the lengthwise axis of the bar parallel to the rotational axis of the cylinder and in a position to facilitate the tool and cylinder to be rotated about the same longitudinal axis to substantially vertically align the point of contact of the cutting blade on the wood and the center of contact of the stabilizer with the tool rest.

20. A stabilizer as claimed in claim 19, wherein the support means comprises a plurality of rotatable bearings located between the outer surface of the hollow cylinder and the housing.

21. A wood turning tool stabilizer, for use with a lathe having a fixed tool rest and with a wood turning tool having a flat bar including a cutting blade at one end for cutting wood turning on the lathe and having a handle attached to the flat bar at the other end for holding the tool, comprising:

a generally cylindrical body having ends that are conically tapered and an intermediate cylindrical surface for contacting the tool rest, and having a longitudinal slot extending from one end of the body to the other, parallel to the longitudinal axis of the cylindrical body, further including a threaded lateral bore in the body for receiving a set screw, wherein the longitudinal slot accepts the flat bar of the tool so that the body extends parallel to the longitudinal axis of the flat bar the longitudinal slot and the cylindrical surface being relatively located and configured so that the stabilizer so as to substantially vertically align the cutting blade where it cuts the wood and the body where it contacts the tool rest.

* * * * *

UNITED STATES PATENT AND TRADEMARK OFFICE

CERTIFICATE OF CORRECTION

PATENT NO. : 4,998,572

DATED : 3/12/91

INVENTOR(S) : Richard Lukes

It is certified that error appears in the above-identified patent and that said Letters Patent is hereby corrected as shown below:

Column 7:

In claim 12, line 31, delete "surface" and insert therefor --surfaces--.

In claim 12, line 32, delete "surface" and insert therefor --surfaces--.

Column 8:

In claim 19, line 13, insert --inside-- following "an".

In claim 19, line 18, insert --;-- following "rest".

In claim 19, line 18, delete "and".

In claim 19, line 10, delete "with" and insert therefor --within--.

In claim 19, line 21, insert --; and-- following "housing".

In claim 19, line 21, delete "means for".

In claim 19, line 22, insert --means for-- before "securing" and begin new sub-paragraph.

Signed and Sealed this

Eighth Day of December, 1992

*Attest:*

DOUGLAS B. COMER

*Attesting Officer*

*Acting Commissioner of Patents and Trademarks*